W. V. TURNER.
FLUID PRESSURE BRAKE.
APPLICATION FILED MAY 21, 1915.
1,249,558.
Patented Dec. 11, 1917.
2 SHEETS—SHEET 2.
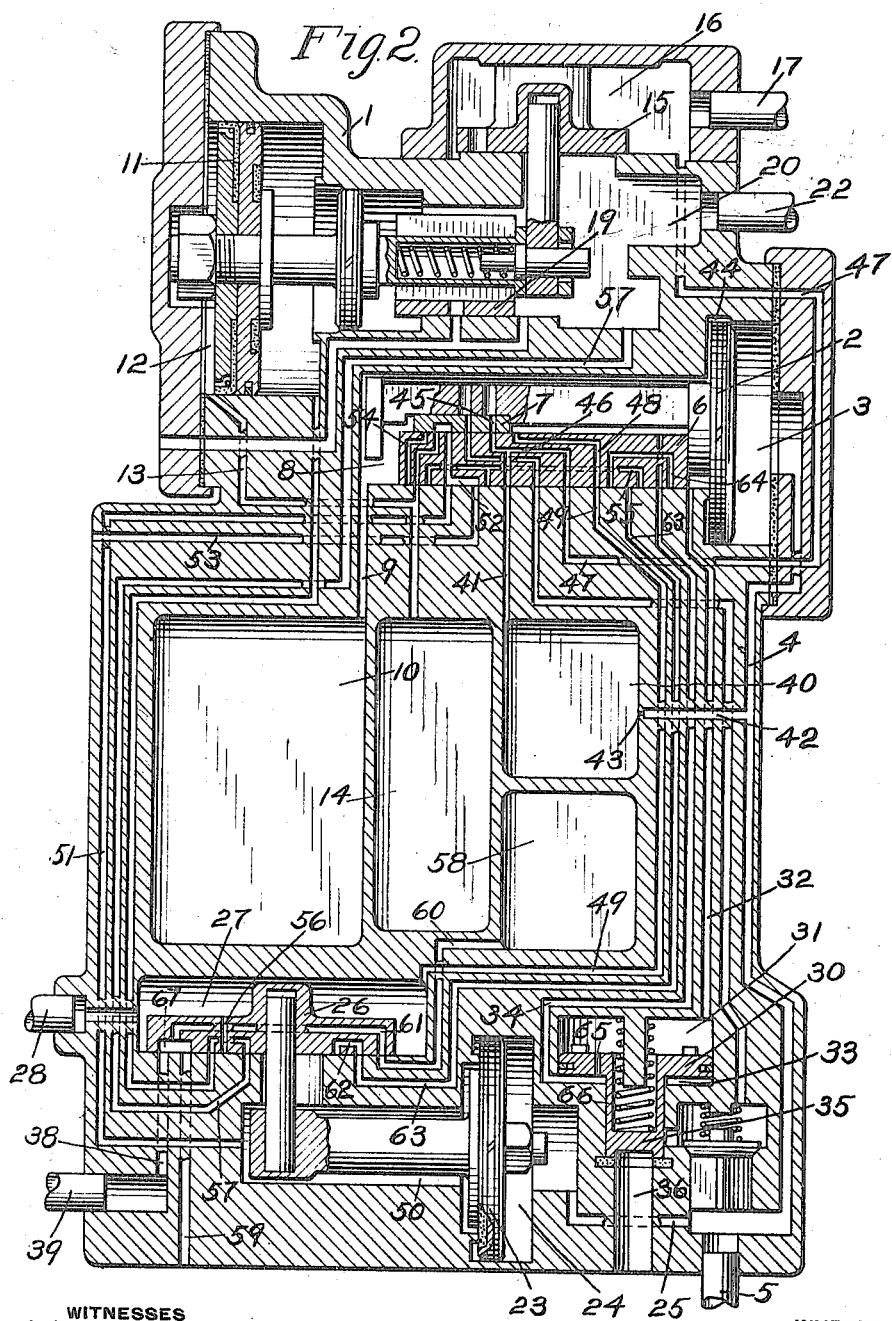
WITNESSES
H. W. Crowell
C. M. Clements
INVENTOR
Walter V. Turner
by Wm. M. Cady
Atty.

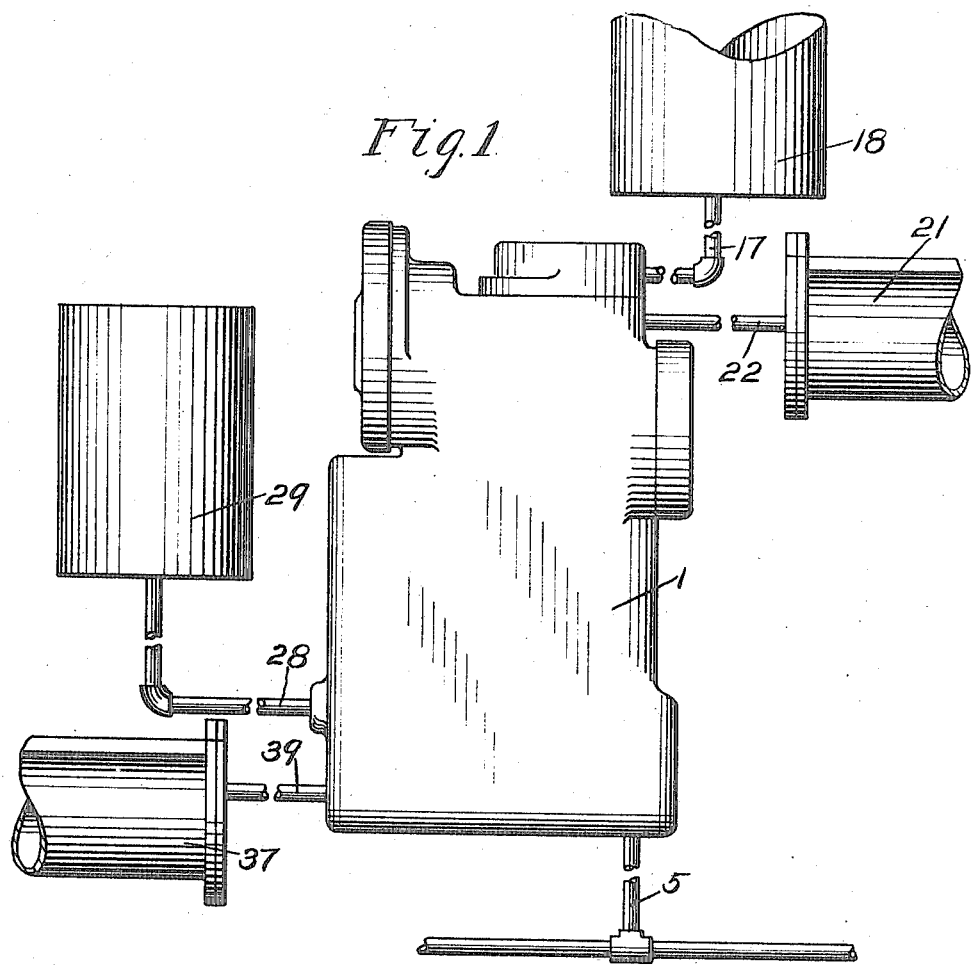

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,249,558.	Specification of Letters Patent.	Patented Dec. 11, 1917.

Application filed May 21, 1915. Serial No. 29,498.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake controlling valve device adapted upon a gradual reduction in brake pipe pressure to effect a service application of the brakes and upon a sudden reduction in brake pipe pressure to effect an emergency application of the brakes.

With an equipment of the above character, there is some possibility of the parts accidentally shifting to emergency application position when only a gradual reduction in brake pipe pressure is made and thereby an emergency application of the brakes is effected when it is intended to produce only a service application.

The principal object of my invention is to provide a brake controlling valve device having means for preventing an emergency application of the brakes upon a gradual reduction in brake pipe pressure, in case the parts accidentally move to emergency application position.

In the accompanying drawings; Figure 1 is a diagrammatic view of a car fluid pressure brake equipment with the improved brake controlling valve device embodied therein; and Fig. 2 a central sectional view of the brake controlling valve device, showing the parts in normal release position.

According to a preferred form of my invention, the controlling valve device 1 may comprise an equalizing portion, a service application portion, and an emergency application portion. The equalizing portion is operated upon a gradual reduction in brake pipe pressure to effect the operation of the service portion to supply fluid to a service brake cylinder, and upon a sudden reduction in brake pipe pressure to effect the operation of the emergency portion to supply fluid to an emergency brake cylinder as well as to the service brake cylinder.

The equalizing portion may comprise a piston 2, contained in piston chamber 3, connected by a passage 4 with brake pipe 5 and a main slide valve 6 and a graduating slide valve 7, contained in valve chamber 8 and adapted to be operated by piston 2, the valve chamber 8 being connected by a passage 9 with a pressure chamber 10.

The service portion may comprise an application piston 11, contained in piston chamber 12 connected by a branched passage 13 with an application chamber 14, said passage leading to the seat of slide valve 6. The piston 11 operates a brake cylinder supply valve 15 contained in valve chamber 16, connected by pipe 17 to a service reservoir 18, and a release valve 19 contained in valve chamber 20 which is open to service brake cylinder 21 through a pipe 22.

The emergency portion may comprise a piston 23 contained in piston chamber 24, open through a passage 25 to the brake pipe 5 and a slide valve 26 contained in valve chamber 27 which is open through pipe 28 to an emergency reservoir 29, the valve 26 being operated by the piston 23.

There is also provided a quick action valve device comprising a piston 30 having the chamber 31 at one side connected to a passage 32 controlled by slide valve 6 and a chamber 33 at the opposite side connected to a passage 34 also controlled by said slide valve. The quick action piston 30 controls a vent valve 35 for venting fluid from the brake pipe 5 to an atmospheric exhaust port 36.

The emergency slide valve 26 controls the admission and release of fluid under pressure to and from an emergency brake cylinder 37 by way of a passage 38 and pipe 39.

A quick action chamber 40 has a passage 41 leading to the seat of the main slide valve 6 and also a passage 42 having a restricted port 43 and opening into brake pipe passage 4.

In operation, when the brake pipe is charged with fluid under pressure, air flows from piston chamber 3 through feed groove 44, charging valve chamber 8 and pressure chamber 10, through passage 9. In the release position of the parts, a port 45 in graduating valve 7 registers with a branched port 46 in slide valve 6, so that fluid is supplied from valve chamber 8 through the respective passages 41 and 47 to charge the quick action chamber 40 and the service reservoir 18. The emergency reservoir 29 is also charged from valve chamber 8 through port 48 and passage 49.

The chamber 50 at the inner side of emergency piston 23 is connected to a passage 51 which in the release position of the main slide valve 6 is connected by a cavity 52 with an exhaust passage 53 and since the piston chamber 24 is open through passage 25 to the brake pipe, it will be seen that normally the piston 23 is held tightly to its seat by brake pipe pressure.

When a gradual reduction in brake pipe pressure is made to effect a service application of the brakes, the equalizing piston 2 is shifted to service position, moving the main slide valve 6, so that service port 54 registers with passage 13. Fluid is then supplied from the pressure chamber 10 to the application chamber 14 and piston chamber 12, operating the piston 11 to close the release valve 19 and open the supply valve 15. Fluid from the service reservoir 18 is thereupon admitted to the service brake cylinder 21 from valve chamber 16. When the pressure in the pressure chamber 10 has reduced by flow to the application chamber to a degree slightly less than the reduced brake pipe pressure, the equalizing piston 2 shifts the graduating valve 7 to close the service port 54 and as soon as the service brake cylinder pressure slightly exceeds the pressure in the application chamber 14, the piston 11 moves the valve 15 to cut off the further admission of fluid to the service brake cylinder.

If a sudden reduction in brake pipe pressure is made, the equalizing piston 2 moves its full traverse to the outer seating gasket and the slide valve 6 is moved, so that a branched cavity 55 therein connects passages 51, 41, and 34, and fluid from the normally charged quick action chamber 40 is admitted to chamber 50 and chamber 33. Since the pressure in piston chamber 24 is now reducing rapidly with the brake pipe while the pressure in chamber 50 is being suddenly increased by flow from the quick action chamber 40, it is evident that the piston 23 will be shifted outwardly. The valve 26 is then operated by the movement of the piston 23 to uncover passage 38, so that fluid is supplied from the emergency reservoir 29 to the emergency brake cylinder 37. A port 56 in the slide valve 26 is also brought into register with a passage 57, which permits fluid from the emergency reservoir to flow to the service brake cylinder 21.

In the release position of the slide valve 26, a chamber 58 is connected to exhaust passage 59 through a passage 60 and a cavity 61 in the valve and in application position, the passage 60 is connected by a cavity 62 with a passage 63 leading to the seat of the main slide valve 6.

With the main slide valve 6 in emergency position, a cavity 64 connects passage 63 with passage 32, so that chamber 31 of the quick action piston 30 is now connected to chamber 58.

The quick action piston was first moved to open position by the admission of fluid from the quick action chamber 40 to the chamber 33 below the piston and said piston will be held in open position until the fluid pressure below the piston can equalize through the small equalizing port 65 into chamber 31 and the reduction chamber 58.

When the fluid pressures on opposite sides of the piston 30 have substantially equalized, the spring 66 operates to move the piston 30 and vent valve 35 to the closed position.

If the equalizing piston 2 should accidentally move to emergency application position, under a gradual reduction in brake pipe pressure, while the quick action chamber 40 will be connected to the emergency piston chamber 50, as in the case of a sudden reduction in brake pipe pressure, the restricted port 43 permits a sufficient back flow from chamber 40 to the brake pipe, so that the pressure in said chamber is maintained substantially equal to the gradually reduced brake pipe pressure and consequently the opposing pressures on the emergency piston 23 remain substantially in equilibrium and no movement of the piston 23 takes place.

Similarly, the pressure in chamber 33 can not build up fast enough to effect the movement of the quick action piston 30, since the equalizing port 65 permits flow from chamber 33 to chamber 31, to correspond with a gradual rate of reduction in brake pipe pressure.

It will now be evident that an emergency application of the brakes will not occur when only a gradual reduction in brake pipe pressure is made, even though the equalizing piston should accidentally move to emergency position, since the movement of the emergency piston 23 depends upon the rate at which the brake pipe pressure is reduced and not merely upon the movement of the equalizing piston to emergency position.

It will be understood, however, that under such conditions, a service application will still be obtained, since the service application piston 11 will be shifted to application position by the uncovering of passage 13 upon movement of valve 6 to emergency position.

When the brakes are released after an emergency application, by increasing the brake pipe pressure, the emergency piston 23 will be shifted to release position, and the emergency brake cylinder connected to the exhaust through cavity 67 in the valve 26.

Having now described my invention, what I claim as new and desire to secure by Letters Patent, is:

1. In a fluid pressure brake, the combination with a brake pipe, of a valve device subject on one side to brake pipe pressure for effecting an emergency application of the brakes and on the opposite side to the pressure of a normally charged chamber having a restricted communication constantly open to the brake pipe.

2. In a fluid pressure brake, the combination with a brake pipe, of a valve for controlling the supply of fluid to effect an emergency application of the brakes and a piston for operating said valve, and subject on one side to brake pipe pressure and on the opposite side to the pressure of a normally charged chamber having a restricted communication open to the brake pipe in applying the brakes.

3. In a fluid pressure brake, the combination with a brake pipe, of a valve for controlling the supply of fluid to effect an emergency application of the brakes, a piston subject on one side to brake pipe pressure for operating said valve, and an equalizing valve device operated upon a reduction in brake pipe pressure for connecting the opposite side of said piston to a normally charged chamber which is open to the brake pipe through a restricted communication.

4. In a fluid pressure brake, the combination with a brake pipe, of a valve for controlling the supply of fluid to effect an emergency application of the brakes, a piston subject on one side to brake pipe pressure for operating said valve, and an equalizing valve device having an emergency position in which the opposite side of said piston is connected to a normally charged chamber which is then open to the brake pipe through a restricted communication.

5. In a fluid pressure brake, the combination with a brake pipe, of a valve device for effecting a service application of the brakes, a valve device subject on one side to brake pipe pressure for effecting an emergency application of the brakes, and an equalizing valve device subject to brake pipe pressure and having a service position for effecting the operation of said service valve device and an emergency application position in which the service valve device is operated and in which the opposite side of said emergency valve device is connected to a normally charged chamber having a restricted communication with the brake pipe.

6. In a fluid pressure brake, the combination with a brake pipe, a service brake cylinder, and an emergency brake cylinder, of a service valve device for controlling the admission of fluid to the service brake cylinder, an emergency valve device, subject on one side to brake pipe pressure for controlling the admission of fluid to the emergency brake cylinder, and an equalizing valve device subject to variations in brake pipe pressure and having a service position for effecting the operation of said service valve device and an emergency position in which the opposite side of said emergency valve device is connected to a normally charged chamber.

7. In a fluid pressure brake, the combination with a brake pipe, of an emergency valve device subject on one side to brake pipe pressure for effecting an emergency application of the brakes and an equalizing valve device subject to variations in brake pipe pressure and adapted in release position to connect the opposite side of said emergency valve device to the atmosphere and in emergency position to connect same with a normally charged chamber which is open to the brake pipe through a restricted communication.

In testimony whereof I have hereunto set my hand.

WALTER V. TURNER.

Witnesses:
A. M. CLEMENTS,
S. W. KEEFER.